UNITED STATES PATENT OFFICE.

LEO HIRSCHFELD, OF NEW YORK, N. Y.

PROCESS OF MAKING CANDY.

No. 903,088.     Specification of Letters Patent.     Patented Nov. 3, 1908.

Application filed May 18, 1907. Serial No. 374,466.

*To all whom it may concern:*

Be it known that I, LEO HIRSCHFELD, a citizen of the United States, and a resident of the city of New York, borough of Manhattan, in the county and State of New York, have invented a new and useful Improvement in the Process of Making Candy, of which the following is a full, clear, and exact description.

The purpose of the invention is to provide a treatment for what is generally known as pulled candy or candy that has been pulled on a fork or by machines, whereby to impart thereto a peculiar consistency, rendering the candy less strenuously tough than ordinarily and permitting the candy after a time to completely dissolve in the mouth, and a further purpose of the invention is by means of the process employed to obtain a product that will retain its consistency for a great length of time.

The invention consists in the novel steps of the process as will be hereinafter described and pointed out in the claims.

The ordinary process employed in making pulled candy consists in cooking the ingredients to a certain degree, cooling the product, and then pulling the candy on a hook by hand or by suitable mechanism, in such manner that it will take up air and so turn light and porous, after which pulling operation the candy while still warm is shaped as desired.

My process relates to the treatment of the candy after it has been pulled and before it is shaped. After the candy has been pulled for the desired length of time, the mass is placed in an oven or other heated receptacle and is subjected to a constant temperature of about 140 to 200° Fahrenheit, for about one-half to two hours, during which time the candy is not in any manner agitated. After the candy has been thus subjected to the dry heat, it is ready to be shaped. The idea of subjecting a batch of candy to dry heat after it has been pulled and before it is shaped, is to impart thereto a peculiar mellow consistency, whereby the candy will retain its peculiar consistency a longer time than it would otherwise and whereby also while tough in a measure it is not unpleasantly so, and will after a reasonable length of time thoroughly dissolve in the mouth.

It will be observed that the candy after pulling and before being shaped is subjected for a period of time to a moderate temperature, which not only cooks the candy under a new condition, but causes the candy to become light and porous to a certain degree, since during this step of the process the candy rises somewhat as would cake dough.

Having thus described my invention, I claim as new and desire to secure by Letters Patent:

1. The herein described process of treating pulled candy, which consists in subjecting the candy without agitation to the action of dry heat after the candy has been pulled and before it is shaped.

2. The herein described process of treating pulled candy, which consists in subjecting the candy to a moderate degree of heat and for a certain period of time, after the candy has been pulled and before it is shaped.

3. The herein described process of treating pulled candy, which consists in subjecting the candy without agitation to a temperature of from 140 to 200° Fahrenheit for a predetermined period of time and then shaping the candy.

4. The herein described process of treating pulled candy, which consists in subjecting the pulled candy without agitation to dry heat at a temperature of about 140 to 200° Fahrenheit for about one half to two hours and then shaping the candy.

In testimony whereof I have signed my name to this specification in the presence of two subscribing witnesses.

LEO HIRSCHFELD.

Witnesses:
     ALBERT ARNS, Jr.,
     GUSTAV J. VOSS.